US009488124B2

United States Patent
Kawabe et al.

(10) Patent No.: US 9,488,124 B2
(45) Date of Patent: Nov. 8, 2016

(54) TURBOCHARGED ENGINE WITH POST FUEL INJECTION CONTROL

(75) Inventors: Takao Kawabe, Osaka (JP); Takashi Miyamoto, Osaka (JP); Satomi Ukai, Amagasaki (JP); Reiko Nakagawa, Amagasaki (JP); Tetsuo Sakaki, Kawasaki (JP); Isamu Kawashima, Kawasaki (JP)

(73) Assignee: YANMAR CO., LTD., Osaka (JP)

( * ) Notice: Subject to any disclaimer, the term of this patent is extended or adjusted under 35 U.S.C. 154(b) by 632 days.

(21) Appl. No.: 12/920,517

(22) PCT Filed: Mar. 2, 2009

(86) PCT No.: PCT/JP2009/053841
§ 371 (c)(1),
(2), (4) Date: Sep. 1, 2010

(87) PCT Pub. No.: WO2009/110419
PCT Pub. Date: Sep. 11, 2009

(65) Prior Publication Data
US 2011/0005223 A1 Jan. 13, 2011

(30) Foreign Application Priority Data
Mar. 3, 2008 (JP) ................................. 2008-052573

(51) Int. Cl.
*F02D 41/40* (2006.01)
*F02B 37/00* (2006.01)
*F02D 41/00* (2006.01)

(52) U.S. Cl.
CPC ............ *F02D 41/405* (2013.01); *F02B 37/00* (2013.01); *F02D 41/0007* (2013.01); *F02D 2200/0406* (2013.01); *Y02T 10/144* (2013.01); *Y02T 10/44* (2013.01)

(58) Field of Classification Search
CPC .. F02B 37/00; F02D 41/0007; F02D 41/405; F02D 2200/0406; Y02T 10/144; Y02T 10/44
USPC ........................ 60/601, 606; 123/464, 559.1
See application file for complete search history.

(56) References Cited

U.S. PATENT DOCUMENTS 4,672,814 A * 6/1987 Abo et al. ........................ 60/602
5,224,853 A * 7/1993 Kazuo et al. .................... 60/602
(Continued)

FOREIGN PATENT DOCUMENTS

FR     2 864 161 A1    6/2005
JP     2002-276340 A   9/2002
(Continued)

OTHER PUBLICATIONS

The Notice of Reasons for Refusal for related Japanese Appl. No. 2008-052573, Japanese Patent Office, mailed Feb. 28, 2012, 6 pgs. (with translation).

(Continued)

*Primary Examiner* — Mary A Davis
(74) *Attorney, Agent, or Firm* — Sterne, Kessler, Goldstein & Fox P.L.L.C.

(57) ABSTRACT

Provided is an engine capable of performing post-injection control with a proper fuel injection amount. The engine (1) comprises an engine body (10) equipped with a turbocharger (7), an engine rotational speed sensor (21), an acceleration opening degree sensor (24), a boost sensor (23), a turbo sensor (22), and an ECU (100) for performing post-injection control. The ECU (100) recognizes the rotational speed of the engine, the supercharging pressure, the load on the engine, and the rotational speed of the supercharger, and so performs the post-injection control that the rotational speed of the supercharger becomes equal to the target rotational speed of the supercharger calculated in the ECU (100).

4 Claims, 4 Drawing Sheets

(56) References Cited

U.S. PATENT DOCUMENTS

| | | | | |
|---|---|---|---|---|
| 5,497,751 | A * | 3/1996 | Ohtake | 123/479 |
| 6,155,050 | A * | 12/2000 | Blanz | F02B 37/18 |
| | | | | 60/603 |
| 6,460,514 | B1 * | 10/2002 | Imai et al. | 123/479 |
| 6,814,059 | B2 * | 11/2004 | Ito et al. | 123/464 |
| 7,792,628 | B2 * | 9/2010 | Aswani et al. | 701/103 |
| 8,117,840 | B2 * | 2/2012 | Hara et al. | 60/601 |
| 2003/0084886 | A1 * | 5/2003 | Akao et al. | 123/559.1 |
| 2006/0107921 | A1 | 5/2006 | Grunaug et al. | |
| 2007/0204602 | A1 * | 9/2007 | Kogo | 60/299 |
| 2008/0034732 | A1 * | 2/2008 | Hosoya | B01D 53/9431 |
| | | | | 60/276 |
| 2008/0223036 | A1 * | 9/2008 | Hara et al. | 60/601 |
| 2009/0031723 | A1 * | 2/2009 | Gehrke et al. | 60/603 |
| 2009/0107456 | A1 * | 4/2009 | Pallett | F02D 37/02 |
| | | | | 123/299 |
| 2010/0236531 | A1 * | 9/2010 | Shimizu et al. | 123/564 |
| 2010/0250101 | A1 * | 9/2010 | Kawabe et al. | 701/104 |
| 2012/0116649 | A1 * | 5/2012 | Stewart et al. | 701/102 |

FOREIGN PATENT DOCUMENTS

| | | | | |
|---|---|---|---|---|
| JP | 2002276340 A * | 9/2002 | | F01N 3/02 |
| JP | 2003-120353 A | 4/2003 | | |
| JP | 2003-269203 | 9/2003 | | |
| JP | 2006-132410 | 5/2006 | | |
| JP | 2007-162585 | 6/2007 | | |
| JP | 2007-332793 A | 12/2007 | | |
| WO | WO 2007085944 A1 * | 8/2007 | | |

OTHER PUBLICATIONS

International Search Report for International Application No. PCT/JP2009/ 053841, mailed Apr. 28, 2009, 1 page.

The Notice of Reasons for Refusal for related Japanese Appl. No. 2008-052573, Japanese Patent Office, mailed Jul. 31, 2012, 4 pgs. (with translation).

Supplementary European Search Report for European Application No. 09716635.9, mailed Jul. 14, 2015, 7 pages.

* cited by examiner

TURBOCHARGED ENGINE WITH POST FUEL INJECTION CONTROL

TECHNICAL FIELD

The present invention relates to an art for performing post-injection control with an engine having a supercharger.

BACKGROUND ART

There is well known multistage fuel injection control of an engine that fuel injection at a plurality of times is performed in one cycle. According to the multistage fuel injection control, combustion can be performed actively so as to reduce combustion noise and exhaust emission. Post-injection control is performed mainly for the purpose of burning particulate matter accumulated in a diesel particulate filter (DPF) or increasing exhaust energy so as to improve acceleration at low speed and small load. The Japanese Patent Laid Open Gazette 2007-162585 discloses construction of an engine in which the post-injection control is performed so as to reclaim the DPF.

However, the post-injection control causes bore flush when injection amount is excessive, thereby being not materialized as fuel injection control. Bore flush is a phenomenon that occurs when fuel collides with a wall surface of a cylinder so as to remove an oil lubrication layer or when fuel is accumulated in an oil pan. Then, the post-injection control performed in a wide range of an operating region for increasing the exhaust energy has not been realized.

DISCLOSURE OF INVENTION

Problems to be Solved by the Invention

The purpose of the present invention is to provide an engine which can perform post-injection control with proper fuel injection amount in a wide range of an operating region.

Means for Solving the Problems

An engine comprises: an engine body equipped with a supercharger; an engine rotational speed detection means which detects engine rotational speed; an engine load detection means which detects load on the engine; a supercharging pressure detection means which detects supercharging pressure; a supercharger rotational speed detection means which detects supercharger rotational speed; and a control means which performs post-injection control at least once in expansion or exhaust stroke so as to increase exhaust energy, wherein the control means recognizes the engine rotational speed, the supercharging pressure, the load on the engine, and the supercharger rotational speed, and performs the post-injection control so as to make the supercharger rotational speed equal to target supercharger rotational speed calculated by the control means.

In the engine according to the present invention, preferably, the control means judges that fuel injection abnormality occurs when the supercharger rotational speed is out of permissible value of the target supercharger rotational speed.

In the engine according to the present invention, preferably, the control means calculates engine rotational speed change ratio based on the engine rotational speed, calculates supercharging pressure change ratio based on the supercharging pressure, calculates supercharger rotational speed change ratio based on the supercharger rotational speed, calculates target supercharger rotational speed change ratio based on the engine rotational speed change ratio, the supercharging pressure change ratio and the supercharger rotational speed change ratio, and performs the post-injection control so as to make the supercharger rotational speed change ratio equal to the target supercharger rotational speed change ratio.

In the engine according to the present invention, preferably, the control means judges that fuel injection abnormality occurs when the supercharger rotational speed change ratio is out of permissible value of the target supercharger rotational speed change ratio.

Effect of the Invention

According to the engine of the present invention, the post-injection control is performed based on the supercharger rotational speed so that the post-injection control can be performed with proper fuel injection amount in the wide range of the operating region.

THE BEST MODE FOR CARRYING OUT THE INVENTION

Figure 1:
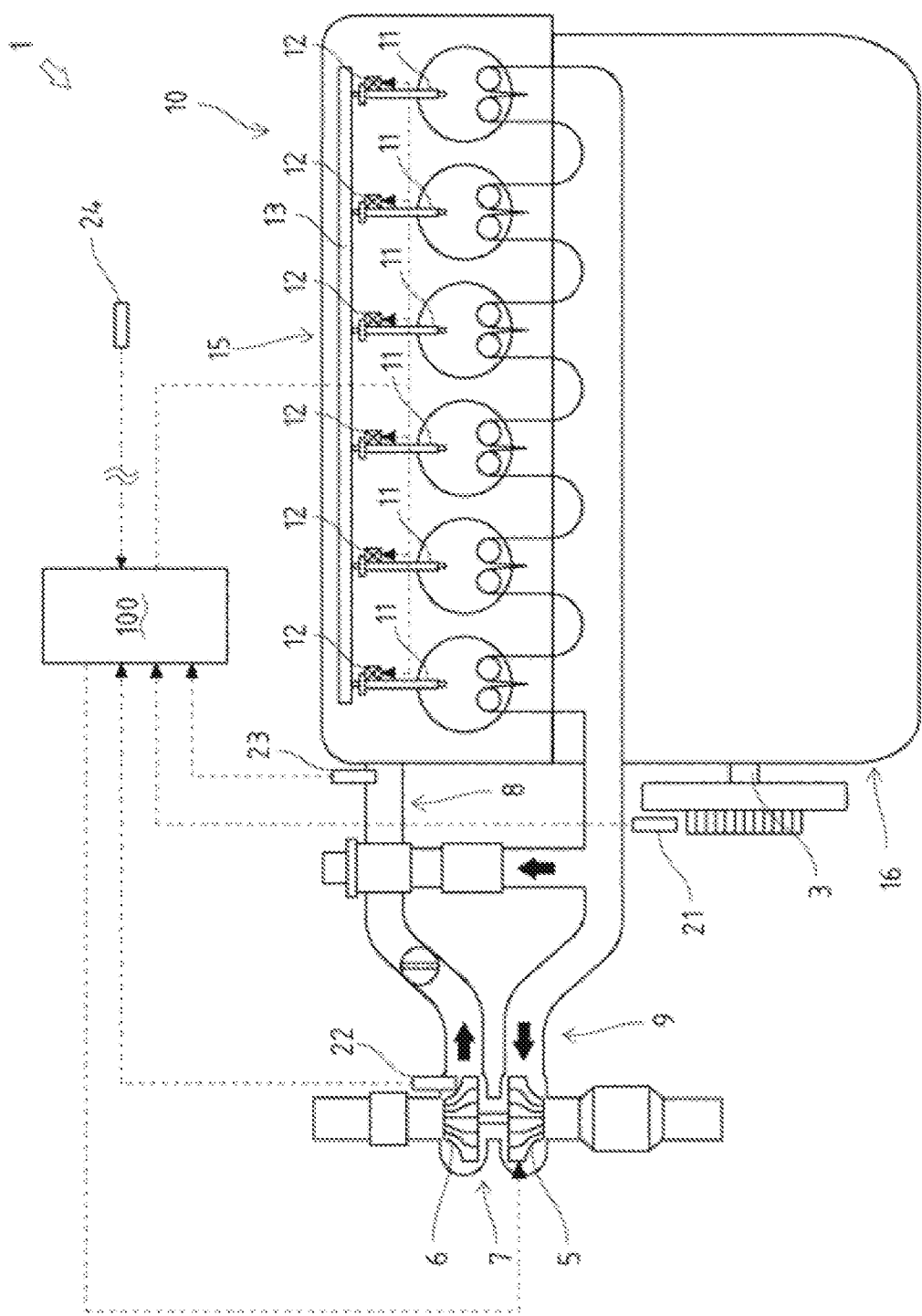
FIG. 1 is a schematic drawing of an engine according to the embodiment of the present invention.

Explanation will be given on an engine 1 which is an embodiment of the present invention referring to FIG. 1. The engine 1 includes an engine body 10, an engine rotational speed sensor 21 as an engine rotational speed detection means which detects engine rotational speed, an acceleration opening degree sensor 24 as an engine load detection means which detects engine load, a boost sensor 23 as a supercharging pressure detection means which detects supercharging pressure (boost pressure), a turbo sensor 22 as a supercharger rotational speed detection means which detects supercharger rotational speed (turbo rotational speed), and an engine control unit (hereinafter, referred to as ECU) 100 as a control means.

The engine body 10 is a 6-cylindered engine having a turbocharger 7 as a supercharger. The engine body 10 has a cylinder head 15 and a cylinder block 16. In the cylinder head 15, an intake pipe 8 is connected to an intake manifold, and an exhaust pipe 9 is connected to an exhaust manifold. A crankshaft 3 is pivotally supported in the cylinder block 16.

The turbocharger 7 has a variable geometry turbo (hereinafter, referred to as VGT) 5 as a capacity variation means disposed in the exhaust pipe 9 and a compressor 6 disposed in the intake pipe 8.

The VGT 5 is a turbine which changes an opening area of a turbine blade of an exhaust turbine following the engine rotational speed so as to change a flow amount of exhaust gas. The mode is not limited to the turbocharger 7, and a mechanism which controls the boost pressure actively such as an active waste gate may alternatively be provided.

An accelerator lever (not shown) is provided in the vicinity of the engine body 10 or an operation part of a machine on which the engine body 10 is mounted, such as a ship. The mode is not limited to the accelerator lever, and a throttle lever may alternatively be provided.

A fuel injection equipment has a common rail 13, injectors 11 and electromagnetic valves 12. The common rail 13 is a pressure vessel in which fuel sent by a fuel injection pump (not shown) is accumulated pressurizingly. Each of the injectors 11 injects the fuel accumulated in the common rail 13 to a corresponding one of the cylinders. Each of the electromagnetic valves 12 opens and closes a fuel passage of a corresponding one of the injectors 11.

The ECU 100 is connected to the engine rotational speed sensor 21, the turbo sensor 22, the boost sensor 23, the acceleration opening degree sensor 24, the electromagnetic valves 12, and the VGT 5.

The engine rotational speed sensor 21 is provided in the vicinity of the crankshaft 3 and detects engine rotational speed Ne. The turbo sensor 22 is provided at the side of the compressor 6 in the turbocharger 7, generates a rotational pulse corresponding to number of blades of the compressor 6, and detects supercharger rotational speed (turbo rotational speed) Nc. As the turbo sensor 22, for example, an eddy-current sensor or a hall sensor may be used. The turbo rotational speed Nc may be divided with a predetermined ratio so as to reduce operation load of the ECU 100. The boost sensor 23 is provided in the intake pipe 8 and detects supercharging pressure (boost pressure) Pb. The acceleration opening degree sensor 24 is provided in the rotational basal part of the accelerator and detects acceleration opening degree Ac.

The ECU 100 calculates a main injection amount QM with a fuel injection amount map f3$q$ (Ne, Ac, QM) based on the engine rotational speed Ne and the acceleration opening degree Ac. The fuel injection amount map f3$q$ (Ne, Ac, QM) is a three-dimensional map previously stored in a storage device of the ECU 100.

Figure 2:
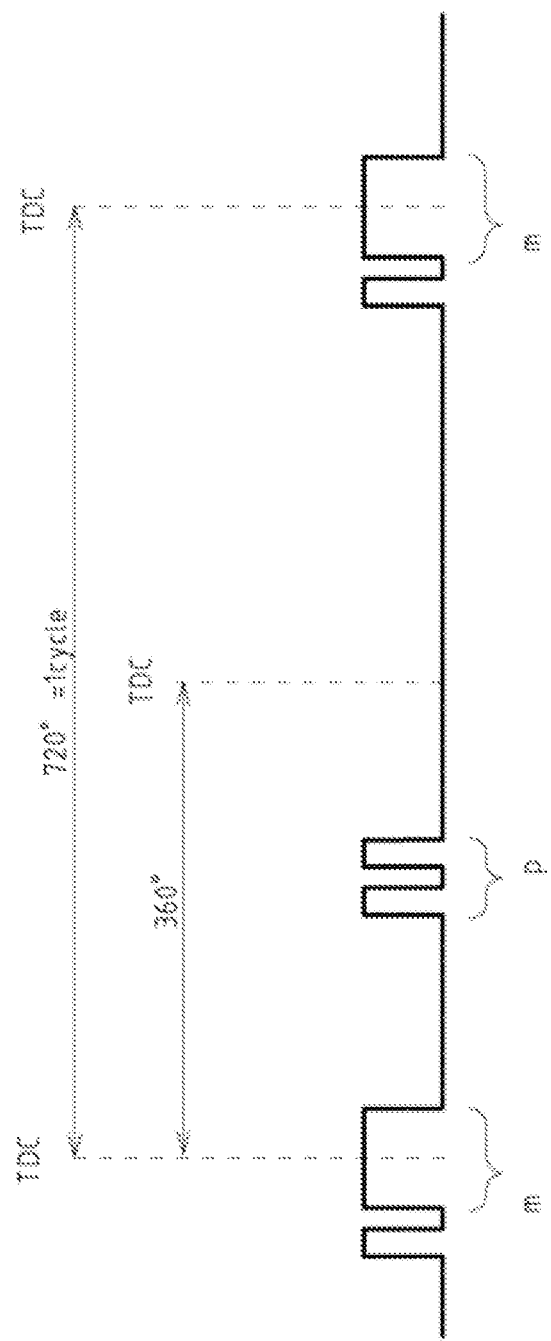
FIG. 2 is a graph of timing of post-injection.

Explanation will be given on post-injection control referring to FIG. 2. The ECU 100 performs the post-injection control with the optimum timing and at times from the expansion stroke to the exhaust stroke of each of the cylinders. FIG. 2 is a time series injection command signal graph for a certain cylinder. Since the engine 1 is 6-cylindered 4-cycle type, a main injection m is performed once in one cycle (720°). The post-injection control p is performed twice in expansion and exhaust stroke from a compression top dead point TDC to an exhaust top dead point TDC by the main injection m.

Figure 3:
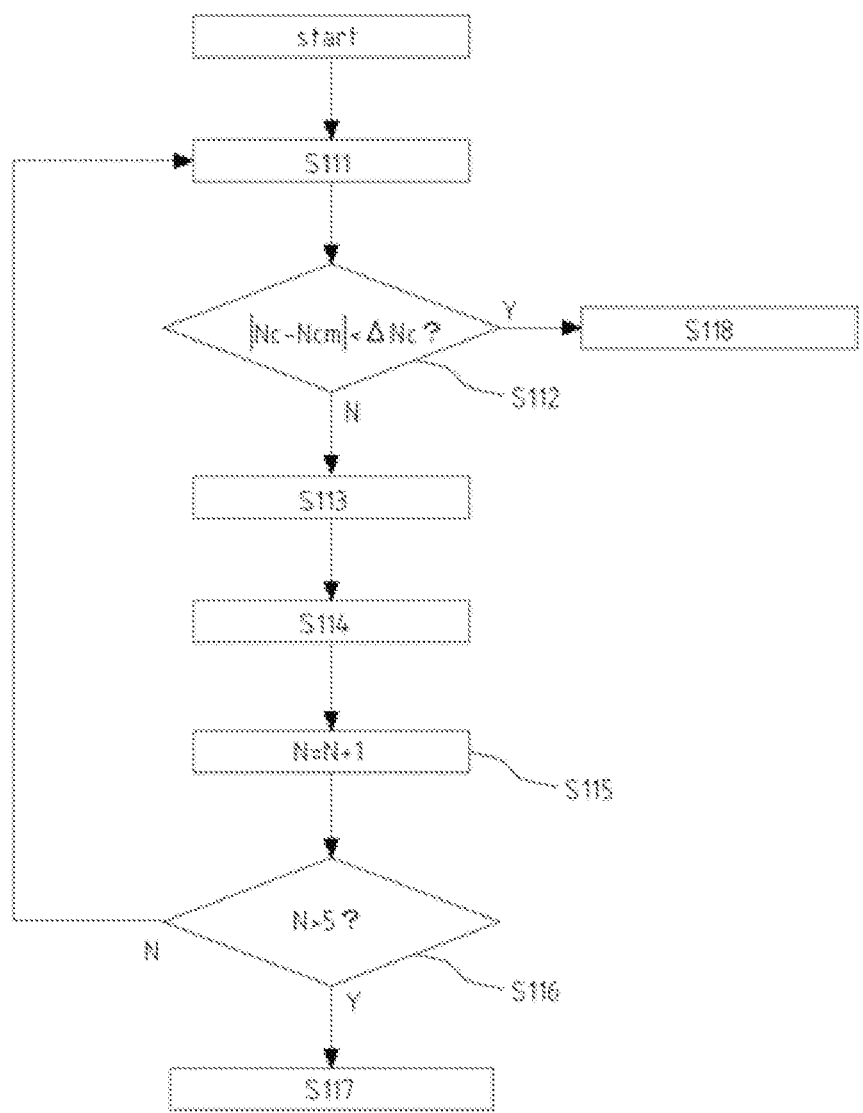
FIG. 3 is a flow chart of post-injection control which is the embodiment 1.

Explanation will be given on flow of post-injection control which is the embodiment 1 referring to FIG. 3. The ECU 100 performs the post-injection control so as to make the turbo rotational speed Nc equal to target turbo rotational speed Ncm which is suitable for the operation state of the engine 1.

Explanation will be given on a target turbo rotational speed map f4$c$ (Ne, Pb, QM, Ncm). The ECU 100 calculates the target turbo rotational speed Ncm with the target turbo rotational speed map f4$c$ (Ne, Pb, QM, Ncm). The target turbo rotational speed map f4$c$ (Ne, Pb, QM, Ncm) is a four-dimensional map which shows correlation of the engine rotational speed Ne, the boost pressure Pb, the main injection amount QM and the turbo rotational speed Nc, and is previously stored in the storage device of the ECU 100.

Since the target turbo rotational speed map f4$c$ (Ne, Pb, QM, Ncm) is previously set in the ECU 100, the map can be set while selecting the target turbo rotational speed Ncm which is optimum to reduce exhaust emission. Concretely, when smoke, CO and I-IC in the exhaust gas are respectively referred to as X (FSN), Y (ppm) and Z (ppm), exhaust emission total amount S is indicated that S=X2+Y2+Z2. In this case, each target turbo rotational speed Ncm in the target turbo rotational speed map f4$c$ (Ne, Pb, QM, Ncm) is set so as to minimize the exhaust emission total amount S.

Accordingly, the target turbo rotational speed Ncm which minimizes noxious gas is previously set, whereby the exhaust emission can be reduced.

At a step S111, the ECU 100 obtains the necessary physical quantities. The ECU 100 obtains the engine rotational speed Ne, the turbo rotational speed Nc, the boost pressure Pb and the acceleration opening degree Ac. The ECU 100 calculates the main injection amount QM based on the engine rotational speed Ne and the acceleration opening degree Ac with the fuel injection amount map f3$q$ (Ne, Ac, QM).

At the step S111, the ECU 100 calculates the target turbo rotational speed Ncm based on the engine rotational speed Ne, the boost pressure Pb and the main injection amount QM with the target turbo rotational speed map f4$c$ (Ne, Pb, QM, Ncm). Furthermore, the ECU 100 calculates a permissible threshold ±ΔΔNc of the target turbo rotational speed Ncm. The threshold ±ΔNc is determined for each target turbo rotational speed Ncm and is changed about the engine rotational speed Ne, the boost pressure Pb and the main injection amount QM.

At a step S112, the ECU 100 judges whether an absolute value of the difference between the turbo rotational speed Nc and the target turbo rotational speed Ncm is smaller than the threshold ΔNc or not. When the absolute value is smaller than the threshold ΔNc at the step S112, the ECU 100 shifts to a step S118 so as to finish the post-injection control and perform the normal operation.

At a step S113, the ECU 100 regulates a post-injection attribute QP (QPm,QPt) when the absolute value is not smaller than the threshold ΔNc. QPt is a number of times of the injection at the post-injection control. QPm is an injection amount at the post-injection control. The concrete regulation of the post-injection attribute QP (QPm, QPt) is not limited. The ECU 100 regulates the post-injection attribute QP (QPm, QPt) so as to make the absolute value of a difference between the turbo rotational speed Nc and the target turbo rotational speed Ncm smaller than the threshold ΔNc.

At a step S114, the ECU 100 regulates a VGT opening degree Fv. The concrete regulation of the VGT opening degree Fv is not limited. The ECU 100 regulates the VGT opening degree Fv so as to make the absolute value of a difference between the turbo rotational speed Nc and the target turbo rotational speed Ncm smaller than the threshold ΔNc.

At a step S115, the ECU 100 increases a counter value N for +1. The counter value N is a number of regulation of the post-injection attribute QP (QPm,QPt).

At a step S116, the ECU 100 judges whether the counter value N is more than 5 or not.

At a step S117, when N is more than 5 at the step S116, the ECU 100 turns a fuel injection abnormality flag ON. On the other hand, when N is not more than 5 at the step S116, the ECU 100 returns to the step S111.

Accordingly, the post-injection control is performed so as to make the turbo rotational speed Nc equal to the target turbo rotational speed Ncm which is suitable for the state of the engine 1, whereby the post-injection control can be performed for the wide range with the necessary minimum fuel injection amount. Simultaneously, bore flush car be prevented.

In this control, even if the supercharger is the VGT 5, the post-injection control can be performed with the turbo rotational speed Nc. Namely, the post-injection control can be performed regardless of the type of the supercharger.

Furthermore, the post-injection control can be performed regardless of the degradation of the injectors 11 and the electromagnetic valves 12 or the change with the passage of time of the engine 1, the fuel injection equipment and the turbocharger 7.

Moreover, according to the steps S115 to S117, the abnormality of the turbocharger 7 or the fuel injection equipment such as the common rail 13, the injectors 11 and the electromagnetic valves 12 can be detected accurately.

Figure 4:
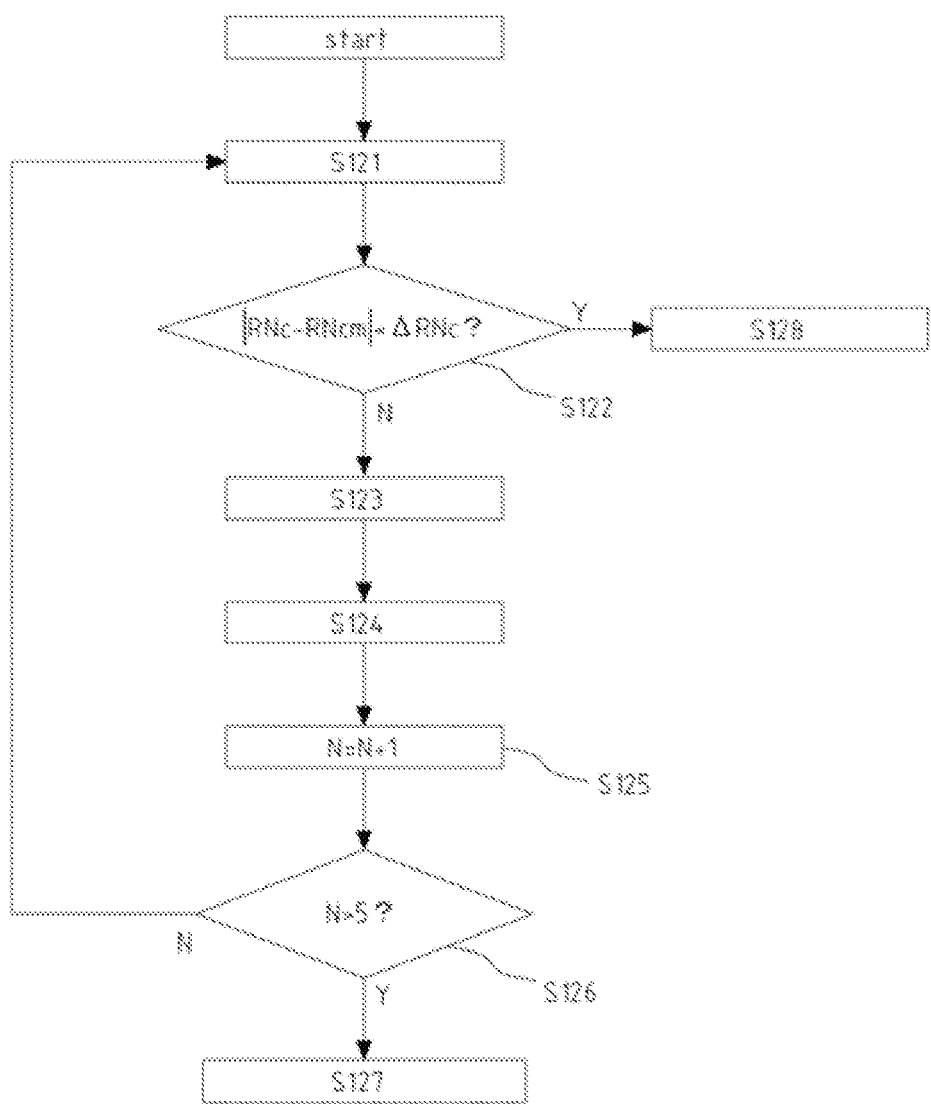
FIG. 4 is a flow chart of post-injection control which is the embodiment 2.

Explanation will be given on flow of post-injection control which is the embodiment 2 referring to FIG. 4. The ECU 100 performs the post-injection control so as to make a turbo rotational speed change ratio RNc equal to a target turbo rotational speed change ratio RNcm which is suitable for the state of the engine 1. This control is performed at transient operation state at which the engine operation state is accelerated or decelerated.

The ECU 100 calculates the target turbo rotational speed change ratio RNcm with a target turbo rotational speed change ratio map f4Rc (RNe, RPb, QM, RNcm). The target turbo rotational speed change ratio map f4Rc (RNe, RPb, QM, RNcm) is a four-dimensional map which shows correlation of an engine rotational speed change ratio RNe, a boost pressure change ratio RPb, the main injection amount QM and the turbo rotational speed change ratio RNc, and is previously stored in the storage device of the ECU 100.

At a step S121, the ECU 100 calculates the engine rotational speed change ratio RNe which is the change ratio of the engine rotational speed Ne at predetermined time. The ECU 100 calculates the turbo rotational speed change ratio RNc which is the change ratio of the turbo rotational speed Nc at predetermined time. Furthermore, the ECU 100 calculates the boost pressure change ratio RPb which is the change ratio of the boost pressure Pb at predetermined time. The ECU 100 obtains the acceleration opening degree Ac with the acceleration opening degree sensor 24.

At the step S121, the ECU 100 calculates the main injection amount QM based on the engine rotational speed change ratio RNe and the acceleration opening degree Ac with a fuel injection amount map f3Rq (RNe, Ac, QM). The fuel injection amount map f3Rq (RNe, Ac, QM) is a map that the engine rotational speed Ne of the fuel injection amount map f3$q$ (Ne, Ac, QM) is replaced with the engine rotational speed change ratio RNe.

Furthermore, at the step S121, the ECU 100 calculates the target turbo rotational speed change ratio RNcm based on the engine rotational speed change ratio RNe, the main injection amount QM and the boost pressure change ratio RPb with the target turbo rotational speed change ratio map f4Rc (RNe, RPb, QM, RNcm). Moreover, the ECU 100 calculates a permissible threshold ±ΔRNcm of the target turbo rotational speed change ratio RNcm. The threshold ±ΔRNcm is determined for each target turbo rotational speed change ratio RNcm and is changed about the engine rotational speed change ratio RNe, the boost pressure change ratio RPb and the main injection amount QM.

At a step S122, the ECU 100 judges whether an absolute value of the difference between the turbo rotational speed change ratio RNc and the target turbo rotational speed change ratio RNcm is smaller than the threshold ΔRNc or not. When the absolute value is smaller than the threshold ΔRNc at the step S122, the ECU 100 shifts to a step S128 so as to finish the post-injection control and perform the normal operation.

Steps S123 to 127 are respectively similar to the steps S113 to 117 of the flow of the post-injection control of the embodiment 1, and so explanation thereof is omitted. Namely, the ECU 100 regulates the post-injection attribute QP (QPm, QPt) and the VGT opening degree Fv so as to make the absolute value of difference between the turbo rotational speed change ratio RNc and the target turbo rotational speed change ratio RNcm smaller than the threshold ΔRNcm.

Accordingly, at the transient operation state of the engine operation, the post-injection control is performed so as to make the turbo rotational speed change ratio RNc equal to the target turbo rotational speed change ratio RNcm which is suitable for the state of the engine 1, whereby the post-injection control can be performed for the wide range with the necessary minimum fuel injection amount. Simultaneously, the bore flush can be prevented.

Each of the above-mentioned two types of the post-injection control is performed until the operation reaches from the expansion stroke to the exhaust stroke of the engine 1, that is, until an exhaust valve (not shown) is closed. Accordingly, fuel injection to the inside of the exhaust manifold is prevented.

INDUSTRIAL APPLICABILITY

The present invention is adoptable to an engine which performs post-injection control.

The invention claimed is:
1. An engine comprising:
   an engine body equipped with a supercharger;
   an engine rotational speed sensor which detects an engine rotational speed;
   an acceleration opening degree sensor which detects a load on the engine;
   a supercharging pressure sensor which detects a supercharging pressure;
   a supercharger rotational speed sensor which detects a supercharger rotational speed; and
   an engine control unit calculates a main injection amount from the engine rotational speed and the acceleration opening degree;
   fuel is injected based on the main injection amount;
   the engine control unit calculates a target supercharger rotational speed based on the engine rotational speed, the supercharging pressure, the main injection amount, and the supercharger rotational speed so as to minimize an amount of smoke, CO and HC in an exhaust gas;
   the supercharger is adjusted based on the target supercharger rotational speed;
   the engine control unit determines an absolute value of a difference between the supercharger rotational speed and the target supercharger rotational speed relative to a threshold and performs the post-injection as follows:
      when the absolute value is greater than the threshold the post-injection control is regulated by at least one of the number of injections in the post-injection control in order to make the absolute value smaller than a threshold; and
   fuel is injected at least once in expansion or exhaust strokes so as to increase exhaust energy based on the post-injection control.

2. The engine according to claim 1, further comprising:
the engine control unit determines a fuel injection abnormality has occurred when the supercharger rotational speed is out of a permissible value of the target supercharger rotational speed.

3. The engine according to claim 1, where the engine control unit further includes the following during transient operation states such as accelerating or decelerating:
calculate an engine rotational speed change ratio based on the engine rotational speed,
calculate a supercharging pressure change ratio based on the supercharging pressure,
calculate a supercharger rotational speed change ratio based on the supercharger rotational speed,
calculate a target supercharger rotational speed change ratio based on the engine rotational speed change ratio, the supercharging pressure change ratio, and the supercharging rotational speed change ratio; and
regulate the post-injection control so as to make a second absolute value of a difference between the supercharger rotational speed change ratio and the target supercharger rotational speed change ratio smaller than a second threshold when the second absolute value is greater than the second threshold.

4. The engine according to claim 3, where the engine control unit determines that a fuel injection abnormality occurs when the supercharger rotational speed change ratio is out of a permissible value of the target supercharger rotational speed change ratio.

\* \* \* \* \*